(No Model.) 3 Sheets—Sheet 1.
C. L. BROWN & E. S. STAFFORD.
MACHINE FOR HARVESTING AND HUSKING CORN.
No. 465,571. Patented Dec. 22, 1891.
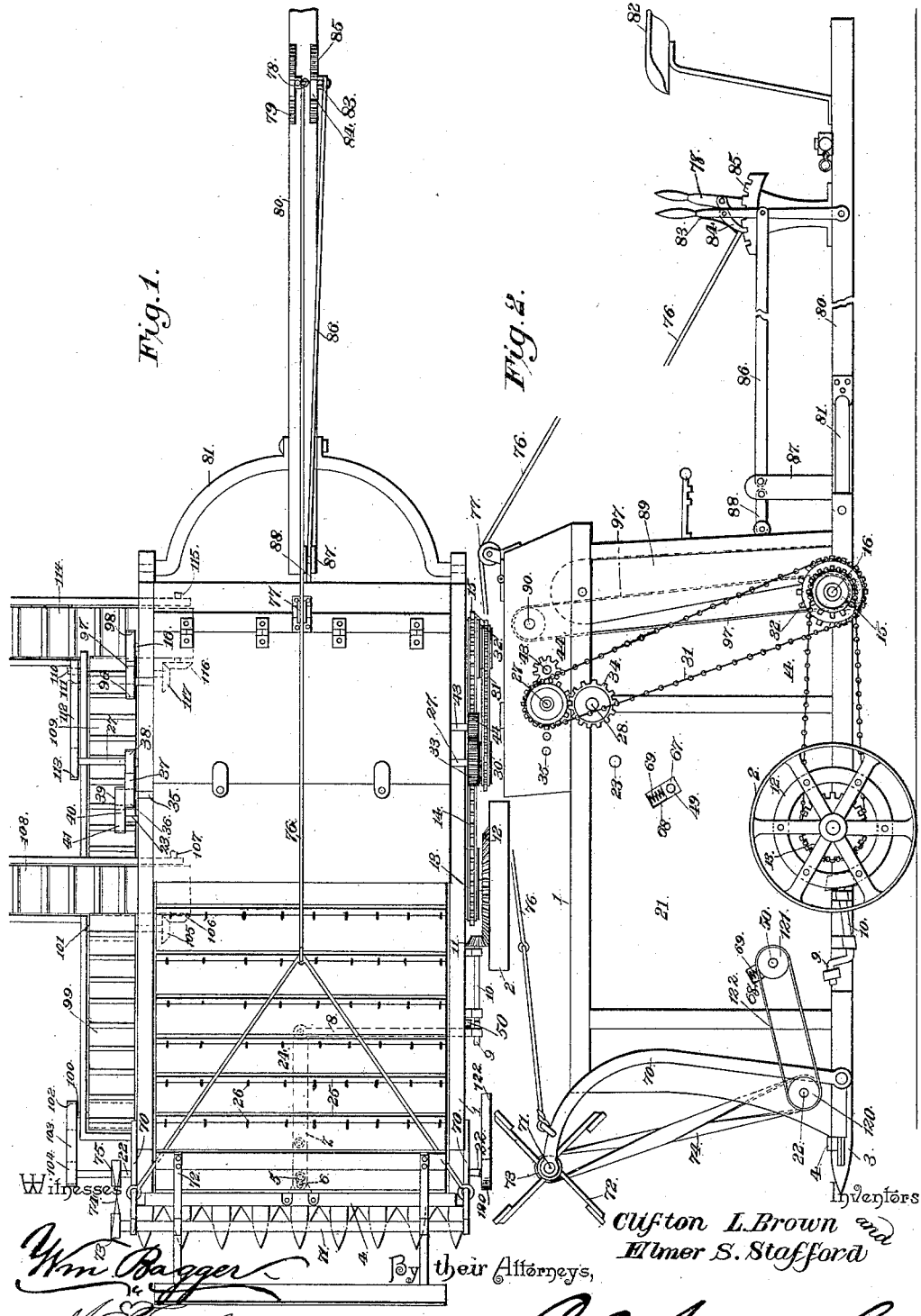

(No Model.) 3 Sheets—Sheet 2.
C. L. BROWN & E. S. STAFFORD.
MACHINE FOR HARVESTING AND HUSKING CORN.
No. 465,571. Patented Dec. 22, 1891.
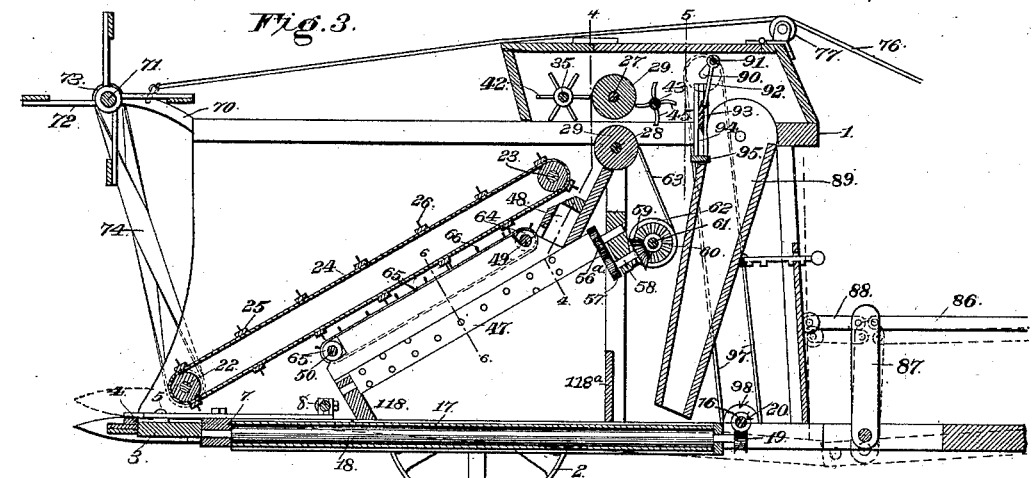
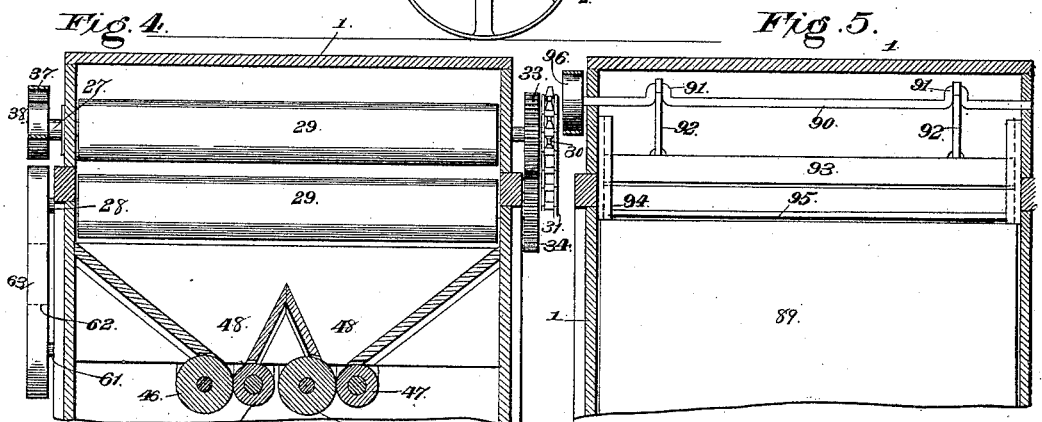
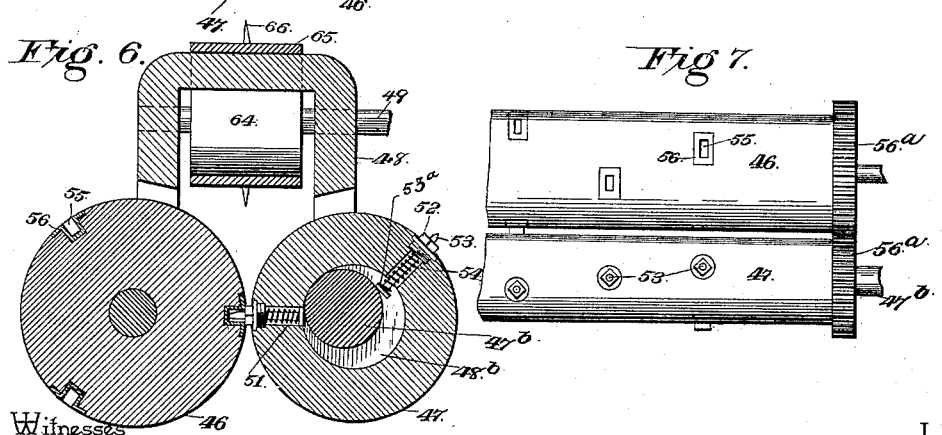
Witnesses
Wm. Bagger
M. Fowler
Inventors
Clifton L. Brown and
Elmer S. Stafford
By their Attorneys,
C. A. Snow & Co.

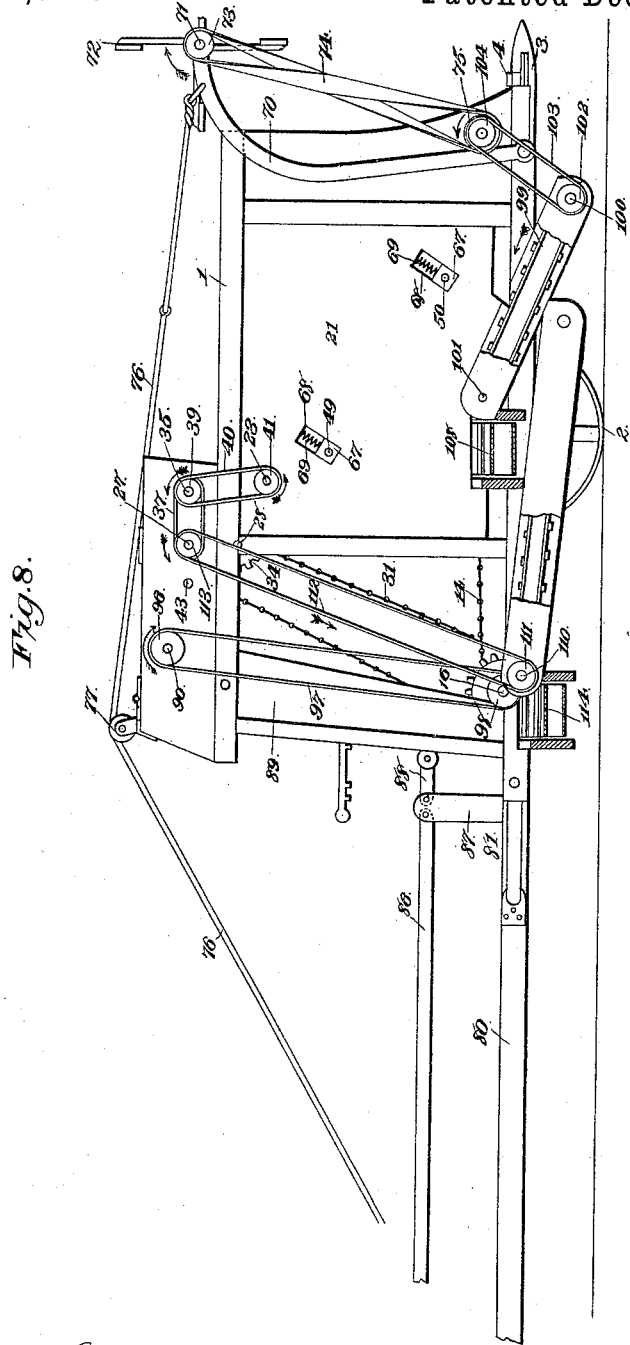

UNITED STATES PATENT OFFICE.

CLIFTON L. BROWN AND ELMER S. STAFFORD, OF CHARITON, IOWA.

MACHINE FOR HARVESTING AND HUSKING CORN.

SPECIFICATION forming part of Letters Patent No. 465,571, dated December 22, 1891.

Application filed January 28, 1891. Serial No. 379,447. (No model.)

*To all whom it may concern:*

Be it known that we, CLIFTON L. BROWN and ELMER S. STAFFORD, citizens of the United States, residing at Chariton, in the county of Lucas and State of Iowa, have invented a new and useful Machine for Harvesting and Husking Corn, of which the following is a specification.

This invention relates to machines for harvesting and husking corn; and it has for its object to provide a machine of this class which shall possess superior advantages in point of simplicity, durability, and general efficiency, and by means of which the corn shall be cut, the ears and the leaves stripped from the stalks, the husks stripped from the ears, and the stalks chopped into pieces of suitable lengths, and the ears, the husks, and the stalks be delivered independently of each other, all as will be hereinafter fully described, and particularly pointed out in the claims.

In the drawings hereto annexed, Figure 1 is a plan view of a machine constructed in accordance with my invention. Fig. 2 is a left side elevation of the same. Fig. 3 is a longitudinal vertical sectional view of the same. Fig. 4 is a transverse sectional view taken on the line 4 4 in Fig. 3. Fig. 5 is a transverse sectional view taken on the line 5 5 in Fig. 3. Fig. 6 is a sectional view taken on the line 6 6 in Fig. 3 and on an enlarged scale. Fig. 7 is a detail plan view of a portion of two of the husking-rollers. Fig. 8 is an elevation of the right side of this machine.

Like numerals of reference indicate like parts in all the figures.

The frame of the machine, which is designated by 1, is supported upon suitable transporting-wheels 2. At the front end of the frame is arranged a finger-bar 3 and a reciprocating cutter-bar 4, which latter is provided with a centrally-arranged pin or stud 5, engaging a slot 6 in the front end of a lever 7, pivoted between its ends to the frame, the rear end of which is connected by a pitman 8 with a crank 9 at the front end of a shaft 10, which is journaled in suitable bearings upon the side of the frame of the machine. The rear end of the shaft 10 carries a pinion 11, meshing with a bevel-gear 12, which is formed upon the inner side of the adjacent transporting-wheel 2, from which motion is in this manner transmitted to the reciprocating cutter-bar.

The hub of the wheel 2, which is provided with the bevel-gear 12, carries a sprocket-wheel 13, which is connected by a chain 14 with a sprocket-wheel 15 upon a shaft 16, which is journaled transversely in the frame. The frame is provided near its sides with bearings for rollers supporting a transversely-arranged and laterally-movable endless carrier 17. One of the rollers 18 supporting said endless carrier is provided at the rear end of its shaft with a worm-wheel 19, meshing with a worm 20 upon the transverse shaft 16. Other suitable means may, however, be employed for transmitting motion at a suitable rate of speed from the shaft 16 to the endless carrier 17.

The frame 1 supports the casing 21, which is provided with bearings for the transverse shafts 22 and 23, supporting an upwardly and rearwardly inclined endless carrier 24, having transverse slats 25, provided with outwardly-extending prongs or fingers 26.

The frame or casing is provided with bearings in rear of the upper end of the endless carrier 24 for a pair of shafts 27 and 28, arranged parallel to each other, and each carrying a roller 29. These rollers, which I call the "snapping-rollers," are placed a short distance apart and one above the other. The upper shaft 27 has at one end a sprocket-wheel 30, which is connected by a chain 31 with the sprocket-wheel 32 upon the shaft 16. The shaft 27 is also provided with a spur-wheel 33, meshing with the spur-wheel 34 upon the shaft 28, to which motion is thus communicated. In front of the shaft 27 is arranged a transverse shaft 35, having a pulley 36, which is connected by a band 37 with a pulley 38 upon the shaft 27. The shaft 35 is also provided with a pulley 39, connected by the belt 40 with a pulley 41 upon the upper shaft 23 of the endless carrier 24, to which latter motion is in this manner transmitted. The shaft 35 is provided with a series of radially-extending arms or feeders 42.

43 designates a shaft, which is arranged transversely in rear of the shaft 27, from which it receives motion through a pinion 44, meshing with the spur-wheel 33. The shaft 43 is provided with curved arms or strippers 45.

The frame or casing of the machine is provided with suitable bearings for several pairs of rearwardly and upwardly inclined rollers or cylinders, as will be seen clearly in Figs. 4 and 6 of the drawings. Each pair comprises the rollers 46 and 47, the former of which is of a diameter slightly exceeding that of the latter. Inclined chutes 48 serve to convey the ears that are to be husked to the upper ends of the said rollers, and the bearings for the latter are in the housings 48, the upper and lower ends of which are to be recessed for the passage of the shafts 49 and 50. The rollers 47 are provided with radial recesses or openings 51, into whose outer ends are screwed the bushings 52, having bearings for suitably-arranged sliding fingers or pegs 53, which are normally forced inwardly by the action of suitably-arranged springs 54, between the bushings 52 and heads 53$^a$ at the inner ends of the pegs. The rollers or cylinders 46 are provided with recesses 55, which may be provided with suitable cups or linings 56 to receive the points of the fingers or pegs 53. The roller 47 revolves upon a stationary shaft 47$^b$, having eccentric grooves 48$^b$ to receive the inner ends of the spring-actuated fingers or pegs 53, which are thereby forced into the cups 56 of the roller 46 when the said rollers revolve. The several rollers 46 and 47 are all provided at their rear ends with spur-wheels 56$^a$, meshing with each other, and one of the said spur-wheels meshes with a pinion 57 upon a counter-shaft 58, having at its rear end a bevel-gear 59, meshing with a bevel-gear 60 upon a transversely-arranged shaft 61, which latter is also provided with a pulley 62, which is connected by a belt or band 63 with a pulley or band wheel upon the shaft 28, carrying the lower snapping-cylinder 29.

The transverse shafts 49 and 50 are provided with drums or pulleys 64, supporting the endless carriers 65, one of which is arranged between and above each pair of husking-rollers 46 and 47. The endless carriers 65 are provided with outwardly-extending prongs 66. The shafts 49 and 50, supporting the said endless carriers, have their bearings in blocks or boxes 67, which are mounted in slots 68 in the sides of the frame or casing and which are forced by the action of springs 69 in a downward direction toward the husking-rollers.

A pair of arms 70, which are pivoted to the sides of the frame, are provided at their upper ends with bearings for a transverse shaft 71, carrying the header-reel 72. The shaft 71 is provided at one end with a pulley 73, connected by a twisted belt 74 with a drum or band wheel 75 upon the shaft 22, from which motion is thus transmitted to the reel. The other end of the shaft 22 has a pulley 120, which is connected by a belt 122 with a pulley 121 on the lower shaft 50 of the carrier 65, described above. The arms 70, supporting the reel 72, are suitably connected with a rope or chain 76, passing over a guide-pulley 77 and having its rear end connected with a hand-lever 78, having a latch or catch adapted to engage a segment-rack 79, which is concentric with the pivotal point of said lever. The latter is pivoted to the tongue 80, which latter is pivotally connected with the rear end of the frame of the machine by means of the yoke or hound frame 81. The said tongue, to the rear end of which the draft is in practice to be attached, also supports the driver's seat 82.

Conveniently arranged within reach of the driver is an additional hand-lever 83, having a spring-actuated catch 84 engaging another segment-rack 85. The lever 83 is connected by a pivoted rod 86 with an upright 87, mounted pivotally at the front end on the tongue. The upper end of said upright is connected by a pivoted link 88 with the rear end of the frame of the machine, so that when the hand-lever 83 is operated the frame will be adjusted to raise or lower the cutting apparatus, as seen in dotted lines in Fig. 3.

Suitably arranged in the rear part of the casing is a pivoted chute or hopper 89, which is adapted to be adjusted with its lower or discharge end above the rear end of the endless carrier 17, or in rear of the latter, as may be desired. The two positions have been indicated, respectively, in Figs. 3 and 2 of the drawings. Suitable means may be employed for retaining the said chute at any desired adjustment.

Arranged transversely in the casing above the chute 89 is a shaft 90, provided with cranks 91, upon which are mounted the pitmen 92, carrying at their lower ends a knife or cutter 93, which is mounted to reciprocate vertically between suitable guides 94. At the lower ends of said guides is arranged a cross-bar 95, forming a bearing-surface for the edge of the knife or cutter. One end of the shaft 90 has a band-wheel 96, which is connected by a belt or band 97 with a drum or pulley 98 upon one end of the shaft 16, from which latter motion is thus transmitted to the knife or cutter.

99 designates an endless carrier which is arranged at one side of the casing upon shafts 100 and 101, the former of which has a pulley 102, connected by a band 103 with the pulley 104 upon the outer end of the shaft 22. The upper shaft 101 has a bevel-gear 105, meshing with a pinion 106 upon one of the shafts 107, supporting an endless carrier 108, which is arranged transversely to the endless carrier 99. The latter receives the husked ears of corn as they are being discharged from the endless carrier 17. A supplementary endless carrier 109 is mounted upon suitable shafts, one of which 110 is provided with a pulley 111, connected by a belt 112 with a pulley 113 upon the outer end of the shaft 27. An endless carrier 114, arranged transversely to the carrier 109, is mounted upon suitable shafts, one of which 115 has a bevel-gear 116 meshing with a bevel-gear 117 upon the shaft 110, from which motion is thus transmitted to the carrier 114. The carrier 109 receives the material discharged from the endless carrier 17 in rear of the partition 118, which supports the lower ends of the husking-cylinders.

The operation of our machine is as follows: When the machine progresses over the field propelled by draft attached to the tongue in rear of said machine, motion is transmitted from the transporting-wheel 2 to the cutting apparatus, which, when desired, may be made sufficiently wide to take in two rows of corn. The cornstalks, assisted by the header-reel, drop upon the endless carrier 24 and are conveyed by the latter between the snapping-cylinders 29, the arms or beaters 42 upon the shaft 35 serving to guide the stalks between said cylinders. The latter, while a sufficient distance apart to admit the stalks and leaves, are too close together to admit of the passage of the ears which are thus snapped off and dropped into the chutes 48. The arms or strippers 45 upon the shaft 43 strip the leaves off the stalks, said leaves dropping upon the endless carrier 17 in front of the chute 89. The stalks are chopped by the vertically-reciprocating cutter 93 into pieces of any desired length, which may be regulated by the rapidity with which the shaft 90 carrying the said cutter is permitted to revolve. The stalks having thus been chopped are guided through the chute 89, either onto the endless carrier 17 or to the ground in rear of the latter, according to the position of the adjusting-chute 89. The ears are guided by the chutes 48 to the husking-cylinders and are carried by the endless carrier 65 in a downward direction over said cylinders, which are rotated as above described. The fingers 53 of the cylinders 47 will engage the husks and strip them off the ears, the latter being permitted to pass downwardly onto the endless carrier 17 in front of the partition 118, while the husks pass between the cylinders and drop upon the endless carrier in rear of said partition. The ears are conveyed by the endless carrier 17 onto the carrier 99 and by the latter to the carrier 108, by which they are eventually deposited in a wagon or other suitable receptacle. The husks and leaves and, if desired, the chopped stalks are likewise carried by the endless carrier 17 to the carrier 109, and thence to the carrier 114, by which they are deposited in some suitable receptacle.

The machine may be adjusted by means of the lever 83, so as to cut the stalks at any desired height above the ground. The reel may in like manner be raised or lowered by means of the hand-lever 78 and the connecting mechanism.

We have in the foregoing described what we consider to be the preferred form of our improved machine; but we desire it to be understood that we reserve the right to any changes or modifications which may be resorted to without departing from the spirit of our invention. Thus, for instance, it may be found desirable to transmit motion to the various parts of the machine in a different manner from that herein described, and the detailed construction of various parts may likewise be altered without materially changing the general construction and impairing the efficiency of the device.

Having thus described our invention, we claim and desire to secure by Letters Patent of the United States—

1. In a machine of the class described, the combination of an inclined endless carrier, the cutting apparatus arranged at the lower end of said carrier, the snapping-cylinders arranged at the upper end of said carrier, revolving shafts in front and rear of said cylinders, the one carrying beater-arms and the other stripper-arms, the husking-cylinders, a chute leading from the beater to the husking-cylinders, and a chopper-knife in rear of the stripper, substantially as set forth.

2. In a machine of the class described, the combination of an inclined endless carrier, the cutting apparatus at the lower end of the same, the transversely-arranged snapping-cylinders at the upper end of said carrier, and revolving shafts in front and rear of said cylinders, the one carrying beater-arms and the other stripper-arms, substantially as set forth.

3. In a machine of the class described, the combination of an inclined endless carrier, the cutting apparatus at the lower end of the same, the snapping-cylinders at the upper end of said endless carrier, and a revoluble shaft arranged in front of said snapping-cylinders and having arms or beaters, substantially as and for the purpose set forth.

4. In a machine of the class described, the combination of an inclined endless carrier, the cutting apparatus at the lower end of the same, the snapping-cylinders at the upper end of said endless carrier, the husking-cylinders, the inclined chutes arranged at the upper ends of said husking-cylinders below the snapping-cylinders, revolving shafts in front and rear of said cylinders, the one carrying beater-arms and the other stripper-arms, a chopper-knife in rear of the stripper, and a pivoted and adjustable chute into which said knife delivers, substantially as and for the purpose set forth.

5. In a machine of the class described, the combination of an inclined endless carrier, cutting apparatus at the lower end of the same, the snapping-cylinders, the husking-cylinders leading forwardly from said snappers, a partition below the front end of said huskers, and a conveyer mounted upon longitudinal shafts in the lower part of the frame of the machine passing beneath said partition and adapted to receive the ears and the husks separately, substantially as and for the purpose set forth.

6. In a machine of the class described, the rotating husking-cylinders arranged in pairs and geared together, one of said cylinders being hollow and provided with radial openings, bushings screwed into the outer ends thereof, pegs sliding through said bushings and having enlarged heads at their inner ends, expansive springs between said bushings and heads, and an eccentric stationary shaft through this cylinder and the other cylinder having recesses registering with said pegs, substantially as described.

7. In a machine of the class described, the combination of the endless carrier, the cutting apparatus at the lower end of the same, the snapping-cylinders at the upper end of said carrier, and a transverse revoluble shaft mounted in rear of said snapping-cylinders and having arms or strippers to strip the leaves from the stalks passing between said snapping-cylinders, substantially as set forth.

8. In a machine of the class described, the combination of the cutting apparatus, the inclined endless carrier, the snapping-cylinders at the upper end of the same, and a vertically-reciprocating knife or cutter arranged in rear of said snapping-cylinders and adapted to cut or chop the stalks as they issue between the latter, substantially as set forth.

9. In a machine of the class described, the combination of the cutting apparatus, the inclined endless carrier, the snapping-cylinders at the upper end of the latter, the revoluble shaft arranged in rear of said snapping-cylinders and having stripping-arms, and a vertically-reciprocating knife or cutter arranged in rear of and adapted to chop the stalks after they have been stripped of their leaves on issuing from the snapping-cylinders, substantially as set forth.

10. In a machine of the class described, the combination of the cutting apparatus, the inclined endless carrier, the snapping-cylinders, the vertically-reciprocating knife or cutter, an endless carrier mounted upon longitudinal shafts in the bottom of the casing, and a pivoted and adjustable chute adapted to receive the chopped stalks and to convey them to said endless carrier or to the ground, as may be desired, as set forth.

11. In a machine of the class described, the combination of the snapping-cylinders, the revoluble shaft arranged in rear of the latter and having the stripping-arms, the vertically-reciprocating knife or cutter, and the pivoted adjustable chute, substantially as set forth.

12. In a machine of the class described, the combination of the cutting apparatus, the inclined endless carrier, the snapping-cylinders and the beater at the upper end of the latter, the husking-cylinders, the auxiliary carriers arranged above the latter and adapted to carry the ears downwardly over the same, the revoluble shaft arranged in rear of the snapping-cylinders and having the arms or strippers, the vertically-reciprocating knife or cutter, the pivoted and adjustable chute arranged below the latter, an endless carrier mounted upon longitudinal rollers in the lower part of the casing, supplemental carriers to receive the corn, husks, and leaves from said endless carrier and to convey the same to suitable receptacles, and suitable operating mechanism, all arranged substantially as and for the purpose herein set forth.

13. The combination of the husking-cylinders provided, respectively, with radially-movable fingers or pegs and with corresponding recesses, the springs to force the said fingers normally in an inward direction, and the stationary shaft supporting the cylinder having said fingers and provided with eccentric grooves engaging the inner ends of the latter, substantially as set forth.

14. In a corn-harvester, the combination, with the cutting apparatus and the carrier leading therefrom, of the snapping mechanism to which said carrier delivers, and the stalk-chopper in rear of said snapping mechanism, as and for the purpose set forth.

15. In a corn-harvester, the combination, with the snapper-cylinders, an inclined chute through which they deliver the ears, and the forwardly-inclined husking-cylinders below said chute, of a partition at the lower end of said husker, over which partition the husked ears are passed, a partition beneath the upper end of said husker dividing the husks from the leaves, and a transverse carrier delivering the ears, husks, and leaves at the side of the machine, substantially as described.

In testimony that we claim the foregoing as our own we have hereto affixed our signatures in presence of two witnesses.

CLIFTON L. BROWN.
ELMER S. STAFFORD.

Witnesses:
O. A. BARTHOLOMEW,
H. H. BARGER.